United States Patent [19]

Kobori et al.

[11] 4,311,371
[45] Jan. 19, 1982

[54] EXPOSURE CONTROL SYSTEM FOR CAMERA

[75] Inventors: Toshio Kobori, Sakai; Masayoshi Sahara, Sennan, both of Japan

[73] Assignee: Minolta Camera Kabushiki Kaisha, Osaka, Japan

[21] Appl. No.: 63,552

[22] Filed: Aug. 3, 1979

Related U.S. Application Data

[63] Continuation of Ser. No. 807,726, Jun. 17, 1977, abandoned.

[30] Foreign Application Priority Data

Jun. 25, 1976 [JP] Japan .................................. 51-75783
Oct. 21, 1976 [JP] Japan ................................ 51-126990

[51] Int. Cl.³ .......................... G03B 7/00; G03B 15/05
[52] U.S. Cl. ......................................... 354/34; 354/51; 354/139
[58] Field of Search ............................ 354/27, 32–35, 354/50, 51, 60 F, 139, 145, 149, 133, 126, 129, 137, 127, 128

[56] References Cited

U.S. PATENT DOCUMENTS

| | | | |
|---|---|---|---|
| 3,688,663 | 9/1972 | Uchiyama et al. | 354/60 F X |
| 3,690,237 | 9/1972 | Fuwa | 354/139 X |
| 3,720,144 | 3/1973 | Uchiyama | 354/60 F X |
| 3,757,654 | 9/1973 | Mori | 354/33 |
| 3,978,496 | 8/1976 | Matsumoto | 354/34 X |
| 4,016,575 | 4/1977 | Uchiyama et al. | 354/139 X |

Primary Examiner—L. T. Hix
Assistant Examiner—William B. Perkey
Attorney, Agent, or Firm—Wenderoth, Lind & Ponack

[57] ABSTRACT

An exposure control system for a photographic camera of a type having a two-curtain type focal plane shutter. When used in combination with an electronic flash device in which the voltage stored on a capacitor is discharged through a flash tube to illuminate the target object to be photographed, this system is switched from an automatic or manual daylight exposure mode to an automatic flash exposure mode when the voltage stored on the capacitor in the flash device reaches a predetermined amount. The shutter is closed in response to the firing of the flash device.

6 Claims, 10 Drawing Figures

EXPOSURE CONTROL SYSTEM FOR CAMERA

This application is a continuation of U.S. Patent Application Ser. No. 807,726 filed on June 17, 1977, now abandoned.

BACKGROUND OF THE INVENTION

The present invention generally relates to a photographic camera having a two-curtain type focal plane shutter and, more particularly, to a photographic camera having an exposure control system which, when used in combination with an electronic flash device, is switched from an automatic daylight exposure mode to an automatic flash exposure mode when a predetermined voltage level is reached in the flash device.

The U.S. Pat. No. 4,016,575, patented on Apr. 5, 1977 or its corresponding German Offenlegungsschrift Nr. 25 14 535 published on Oct. 30, 1975 discloses a flash photography exposure control system for a photographic camera having an electrically timed shutter provided with an electronic or mechanical changeover switch by which the camera is switchable from an automatic daylight exposure mode to an automatic flash exposure mode when a threshold voltage level is reached in the electronic flash circuitry of a strobe or flash device detachably coupled to the camera.

This known flash photography exposure control system comprises a first timing circuit which is rendered operative when the camera is set in the automatic daylight exposure mode, a second timing circuit which is rendered operative when the camera is set in the automatic flash exposure mode, a comparator selectively responsive to the first and second timing circuits for energizing and deenergizing an electromagnetic coil for exposure control, and a changeover switch responsive to the voltage of a trigger capacitor in the flash device for selectively connecting the timing circuits to the comparator.

The second timing circuit includes a variable resistor forming a part of the time constant circuit together with a capacitor included in the first timing circuit, which variable resistor is so adjusted as to provide a timed interval for flash photography.

With the known flash photography exposure control system, a photographer trying to take a photographic picture of a target object to be photographed under flash lighting need not adjust the shutter speed selecting dial to a predetermined shutter speed, for example, 1/60 second or less, which had theretofore been required because of a compromise between the large inertia of the shutter and the output characteristics of the flash device. This is possible because, when the voltage stored on a capacitor in the flash device, this voltage being discharged through the discharge flash-tube upon actuation of a trigger circuit including a trigger capacitor to illuminate the target object, attains a predetermined amount, the first timing circuit becomes inoperative while the second timing circuit becomes operative. In other words, the known flash photography exposure control system is designed so that the changeover switch causes the first timing circuit to be inoperative and the second timing circuit to be operative when a threshold voltage level is reached in the electronic flash device.

While the known flash photography exposure control system is satisfactory, it has been found that the shutter remains opened for an appreciable period of time subsequent to the firing of the flash device. This is because the electromagnetic coil operatively associated with the shutter is connected to the second timing circuit during the actual taking of a photographic picture under flash lighting so that the electromagnetic coil is deenergized to close the shutter only after a predetermined period of time determined by the setting of the variable resistor of the second timing circuit has passed.

The fact that the shutter remains opened for an appreciable period of time subsequent to the firing of the flash device may be undesirable depending upon the actual situation in which the photographic picture is taken. Moreover, the employment of a variable resistor for controlling the shutter speed for flash photography appears to cause variation in the quality or performance of the flash photography exposure control systems in view of the fact that the manufacture of the variable resistors having uniform and equal performance characteristics is difficult.

SUMMARY OF THE INVENTION

Accordingly, the present invention has been developed to substantially eliminate the above described disadvantages inherent in the prior art flash photography control system and is intended to provide a photographic camera having a two-curtain type focal plane shutter capable of closing in response to the firing of the electronic flash device.

According to the present invention, when the voltage stored on a capacitor in the flash device has not yet attained the predetermined amount, the camera works in an ordinary manner. In other words, the camera is set in an automatic or manual daylight photography exposure mode. However, when the voltage stored on the capacitor in the flash device attains the predetermined amount, the camera is set in an automatic flash photography exposure mode, but is automatically switched from the automatic flash photography exposure mode back to the automatic or manual daylight photography exposure mode in response to the firing of the flash device.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
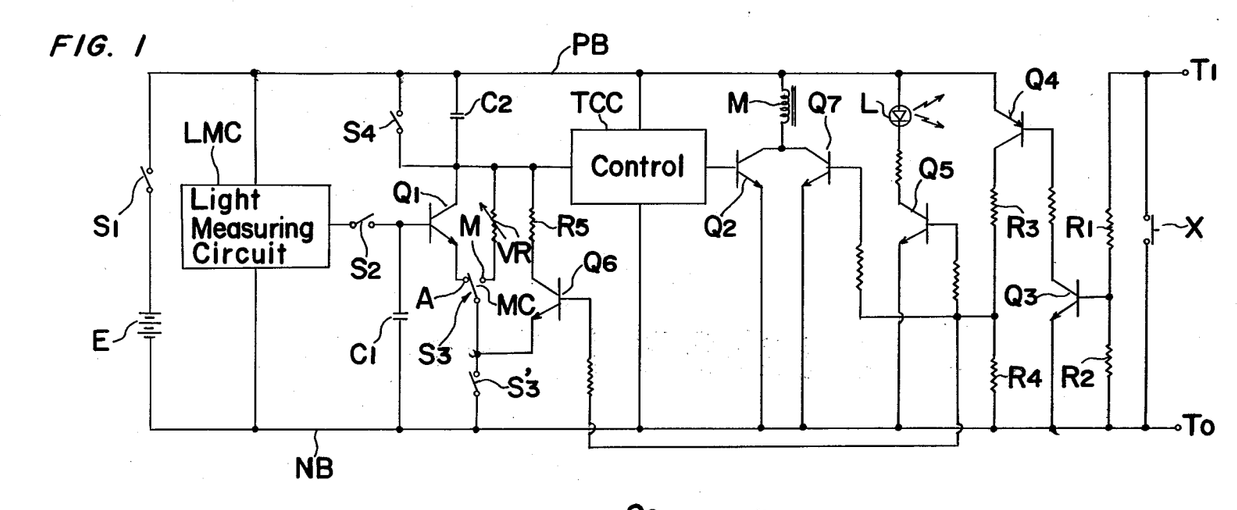
FIG. 1 is a circuit diagram of a first embodiment of a flash exposure control system for a photographic camera.
Figure 2:
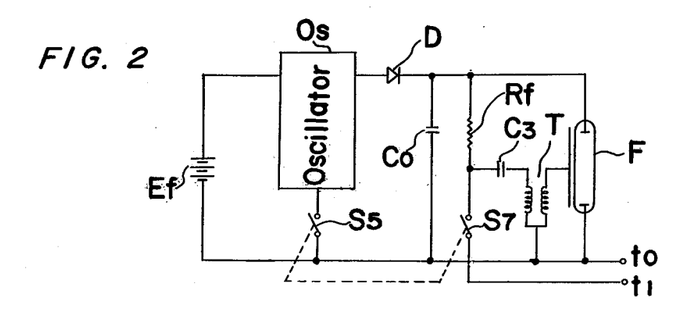
FIG. 2 is a circuit diagram of one example of a flash system of a flash device utilizable with the system shown in FIG. 2.
Figure 3:
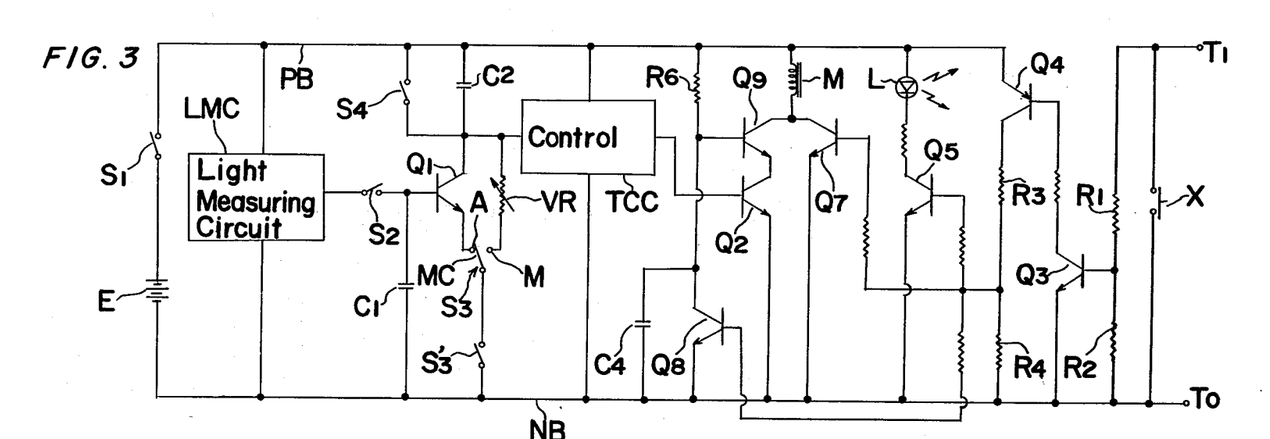
FIG. 3 is a circuit diagram of a second embodiment of the flash exposure control system which may be utilizable with the flash system of FIG. 2.

Referring first to FIG. 2, there is shown one example of an electronic flash system which can be utilized in combination with a photographic exposure control system as shown in FIGS. 1 and 3 and described later. The electronic flash system shown in FIG. 2 comprises a high voltage power generating circuit including a D.C. power source Ef and a series connected blocking oscillator Os and a main switch $S_5$. This series circuit Os and $S_5$ is connected across the D.C. power source Ef. A series circuit of a rectifying diode D and a main capacitor Co is connected across the high voltage power generating circuit. The main capacitor Co is operable to store a predetermined amount of electric energy which is subsequently discharged through a discharge flash-tube F when the latter is triggered by a trigger coil T. A series circuit of a resistor Rf and a trigger capacitor $C_3$ is connected across the main capacitor Co so that the trigger capacitor $C_3$ can be charged through the resistor Rf to a voltage proportional to the voltage of charge stored on the main capacitor Co.

The flash system shown in FIG. 2 is in practice incorporated in a flash housing (not shown) having a pair of terminals to and $t_1$. Terminal $t_1$ is connected through a switch $S_7$ to the junction between the resistor Rf and the capacitor $C_3$ and terminal $t_o$ is connected through the trigger coil T to the opposite terminal of the capacitor $C_3$. These terminals to and $t_1$ are exposed to the outside of the flash housing for external electric connection with synchro-terminals To and $T_1$ on the side of a photographic camera by any known manner when the flash unit is coupled to the photographic camera.

It is to be noted that the switches $S_5$ and $S_7$ may be in the form of a double-throw switch and are operatively associated with each other so that, when the switch $S_5$ is closed, the switch $S_7$ can also be closed, and vice versa.

From the foregoing, it will readily be understood that, when and after the voltage stored on the main capacitor Co reaches the predetermined amount subsequent to closure of the switches $S_5$ and $S_7$, an electric connection between the synchro-terminals To and $T_1$ and, therefore, the terminals to and $t_1$, results in actuation of the trigger circuit, composed of the trigger capacitor $C_3$ and the trigger coil T, whereby the electric energy in the main capacitor Co is instantaneously discharged through the discharge flash-tube F to illuminate, for example, an object to be photographed.

In general, the electric connection between the synchro-terminals To and $T_1$ is achieved by closure of a synchro-switch X so incorporated in the photographic camera together with the exposure control system and so associated with a two-curtain type focal plane shutter of the photographic camera as to be closed in response to the full opening of the shutter. The full opening of the shutter is generally achieved when the leading curtain, which constitutes a part of the two-curtain type focal plane shutter and which has been moved to a cocked or charged position together with the trailing curtain, is moved back to the original, released position independently of the trailing curtain then retained in the cocked position as is well known to those skilled in the art. In any event, the operation and construction of the synchro-switch X is well known to those skilled in the art.

Referring now to FIG. 1, the photographic exposure control system comprises a power source E, having a positive terminal connected through a main power switch $S_1$ to a positive bus PB and a negative terminal connected to a negative bus NB, and a known light measuring circuit LMC connected in parallel to the power source E and having an output terminal connected to the base of a switching transistor $Q_1$ through a switch $S_2$. The switch $S_2$ is normally closed and is opened when an aperture setting diaphragm, generally built into the objective lens assembly of a photographic camera, stops down to a preselected f-stop number.

While the details of the light measuring circuit LMC are herein omitted for the sake of brevity because its construction is known to those skilled in the art, it is to be understood that the light measuring circuit LMC generally includes a photodetector circuit for generating an electric signal indicative of the brightness of the target object to be photographed and a computing circuit for processing the electric signal from the photodetector circuit in consideration of the speed or sensitivity of the photosensitive film used and the f-stop number set in the objective lens assembly of the photographic camera and for generating an output signal determinative of the particular shutter speed appropriate to the particular lighting condition, relative to the photographic parameters preset in the camera, in which the target object is placed. This output signal is in turn applied to the base of the transistor $Q_1$ through the switch $S_2$ when the latter is closed.

The transistor $Q_1$ has a collector connected to the positive bus PB through a parallel circuit, composed of a timing capacitor $C_2$ and a switch $S_4$, and an emitter connected to the negative bus NB through a automanual selection switch $S_3$ and a switch $S'_3$. The switch $S'_3$ is normally opened, but is closed simultaneously with the start of movement of the leading curtain of the shutter from the cocked position towards the released position. The automanual selection switch $S_3$ has a pair of fixed contacts A and M, the contact A being connected to the emitter of the switching transistor $Q_1$ and the contact M being connected through a potentiometer VR to the junction between the parallel circuit of the switch $S_4$ and capacitor $C_2$ and the collector of the transistor $Q_1$, and a movable contact MC connected to the negative bus NB through the switch $S'_3$. When the movable contact MC of selection switch $S_3$ is engaged with the fixed contact A as shown, the photographic camera is switched to an automatic exposure control mode in which the shutter speed is determined substantially by the output signal from the light measuring circuit LMC. When the movable contact MC is engaged to the fixed contact M, the same camera is switched from the automatic exposure control mode to a manual exposure control mode in which the shutter speed is determined by the resistance setting of the potentiometer VR which is in turn determined by the position of a movable tap of the potentiometer VR set at the will of the photographer. Thus depending on the position of switch $S_3$, either capacitor $C_2$ and transistor $Q_2$ or capacitor $C_2$ and potentiometer VR together with TCC serves as a time determining circuit.

The exposure control system further comprises a transistor control circuit TCC of a known construction having an output terminal, connected to the base of a switching transistor $Q_2$, and an input terminal connected to the junction between the parallel circuit ($S_4$ and $C_2$) and the collector of the transistor $Q_1$. This transistor control circuit TCC is designed so that, when and so long as the voltage stored on the capacitor $C_2$ is below a predetermined value, the output signal from the transistor control circuit TCC is a high level state to render the transistor $Q_2$ conducting and, when and so long as the voltage on the capacitor $C_2$ exceeds the predetermined value, the output signal from transistor control circuit TCC is a low level state to render the transistor $Q_2$ non-conducting.

The transistor $Q_1$ is switched on by supplying a voltage to its base proportional to the voltage stored in storing capacitor $C_1$ connected between the base of the transistor $Q_1$ and the negative bus NB which stores the voltage of the output signal from the light measuring circuit LMC when the switch $S_2$ is closed.

An electromagnetic coil M has one end connected to the positive bus PB and the other end connected to the negative bus NB through the transistor $Q_2$ on the one hand and through a switching transistor $Q_7$ on the other hand. Electromagnetic coil M retains the trailing curtain of the shutter in the cocked position, irrespective of the movement of the leading curtain from the cocked position towards the released position, when it is energized upon conduction of the transistor $Q_2$ by the supply of a high level output signal from the control circuit TCC to the base of said transistor $Q_2$.

In the construction so far described, it is clear that, assuming that the leading curtain has been moved back towards the released position by the depression of a shutter release button (not shown) independently of the trailing curtain then retained in the cocked position with the electromagnetic coil M energized, deenergization of the electromagnetic coil M allows the trailing curtain to move back towards the released position in pursuit of the leading curtain. Thus electromagnetic coil M comprises a closing means for closing the shutter. The movement of the trailing curtain from the cocked position back to the released position in pursuit of the leading curtain takes place when the transistor $Q_2$ becomes non-conducting by the supply of a low level output signal from the control circuit TCC to the base of the transistor $Q_2$. The duration of conduction of the transistor $Q_2$ is in turn determined by the time required for the capacitor $C_2$ to change to the predetermined voltage. The voltage stored on the capacitor $C_2$ is discharged automatically when it attains the predetermined amount and the switch $S_4$ closes when the trailing curtain completes its travel from the cocked position back to the released position. Thus transistor $Q_2$ operates as a first control means which controls the electromagnetic coil M according to the time set by the time determining circuits including C1, $Q_1$ or VR and TCC.

The circuit so far described above (with the exception of transistor $Q_7$ and electromagnetic coil M) is referred to as a first switching circuit and may be utilized to control the two-curtain type focal plane shutter in a conventional manner irrespective of the use of any type of flash unit.

The exposure control system further comprises a flash-governed, second switching circuit operable only when the electronic flash unit having the flash system of FIG. 2 is coupled to the photographic camera which renders the first switching circuit inoperative when the voltage on the trigger capacitor $C_3$ reaches a predetermined amount. The second switching circuit includes switching transistors $Q_3$, $Q_4$, $Q_5$, $Q_6$ and $Q_7$.

The transistor $Q_3$ has a base connected to the terminal $T_1$ through a resistor $R_1$ and to the terminal $T_o$ through a bias resistor $R_2$, a collector connected through a resistor to the base of the transistor $Q_4$, and an emitter connected to the negative bus NB. The resistor $R_1$ has a relatively high resistance selected to avoid unnecessary discharge of the voltage stored on the trigger capacitor $C_3$ prior to closure of the synchro-switch X when the terminals to and $t_1$ on the side of the flash housing are respectively coupled to the synchro-terminals To and $T_1$, but to allow the transistor $Q_3$ to be brought into a conducting state when the voltage stored on the main capacitor Co reaches a predetermined amount.

On the other hand, the transistor $Q_3$ is held in a non-conducting state when the voltage stored on the capacitor Co falls below or has not yet attained the predetermined value, that is, when the voltage stored on the capacitor Co is below the predetermined value.

Conduction of the transistor $Q_3$ allows a base current to be supplied to the transistor $Q_4$ to cause the latter to conduct. While the base of the transistor $Q_4$ is connected to the collector of the transistor $Q_3$, the emitter of transistor $Q_4$ is connected to the positive bus PB and the collector of transistor $Q_4$ is connected through a series circuit of output resistors $R_3$ and $R_4$ to the negative bus NB. The junction between the output resistors $R_3$ and $R_4$ is connected to the base of each of the transistors $Q_5$, $Q_6$ and $Q_7$ through a suitable resistor. Thus transistors $Q_3$ and $Q_4$ operate as a detecting means for detecting when the energy stored in the electric energy storing means capacitor Co exceeds the predetermined value.

The second switching circuit further comprises an indicator lamp L, for example, a light emitting diode, inserted between the positive bus PB and the collector of the transistor $Q_5$ together with a suitable resistor. The emitter of the transistor $Q_5$ is connected to the negative bus NB. The transistor $Q_5$ serves as a switch for the indicator lamp L and, therefore, when the transistor $Q_5$ is brought into a conducting state in response to conduction of the transistor $Q_4$ which takes place upon conduction of the transistor $Q_3$, the indicator lamp L is lit to the eyes of the photographer showing that the voltage stored on the capacitor Co has reached the predetermined value. In other words, the indicator lamp L when so lit informs the photographer that the camera is ready to work with the flash unit in a flash photography mode.

Conduction of the transistor $Q_4$ results in simultaneous conduction of the transistors $Q_6$ and $Q_7$.

The transistor $Q_6$ has an emitter connected to the negative bus NB through switch $S'_3$ and a collector connected through a resistor $R_5$ to the junction between the parallel circuit ($S_4$ and $C_2$) and the collector of the transistor $Q_1$. Therefore, when the transistor $Q_6$ is brought into a conducting state, the capacitor $C_2$ can be charged to the predetermined voltage in a shorter time than the time required for the same capacitor $C_2$ to be charged by the current flowing only through either the transistor $Q_1$ or the potentiometer VR depending upon the position of the movable contact MC of the selection switch $S_3$. This is because, when the transistor $Q_6$ is brought into the conducting state, the resistor $R_5$ is inserted in parallel to of the emitter-follower circuit of the transistor $Q_1$ or the potentiometer VR, thereby reducing the time constant determined by the combination of the capacitor $C_2$ with either the transistor $Q_1$ or the potentiometer VR. In other words, the circuit composed of the transistor $Q_6$ and the resistor $R_5$ serves to adjust the time constant of the time constant circuit ($C_2$ and $Q_1$ or VR) to a lower value than that without the resistor $R_5$.

The operation of the photographic exposure control system of FIG. 1 combined with the flash system of FIG. 2 will now be described with reference to FIGS. 1 and 2.

The transistor $Q_3$ is held in the non-conducting state during any one of the following conditions:

(1) The flash unit is not coupled to the photographic camera;

(2) Even if the flash unit is coupled to the photographic camera, the switch $S_5$ on the side of the flash unit has not yet been closed; and (3) Even if the flash unit is coupled to the photographic camera and the switch $S_5$ is subsequently closed, the voltage stored on the capacitor Co has not yet attained the predetermined amount.

During non-conduction of the transistor $Q_3$, the transistors $Q_4$, $Q_5$, $Q_6$ and $Q_7$ are also held in a non-conducting state as hereinbefore described and, therefore, the time at which the electromagnetic coil M is deenergized to permit the trailing curtain to move from the cocked position towards the released position in pursuit of the leading curtain is governed by the first switching circuit. More specifically, upon release of the shutter, the leading curtain is driven from the cocked position to the released position independently of the trailing curtain which is held in the cocked position by electromagnetic coil M and, simultaneously therewith the switch $S_4$ is opened to permit the capacitor $C_2$ to be charged by the current flowing through the potentiometer VR if the movable contact MC of the switch $S_3$ is engaged with the fixed contact M or by the current flowing through the collector-emitter circuit of the transistor $Q_1$ if the movable contact MC is engaged with the fixed contact A.

Note that the current flowing through the collector-emitter circuit of the transistor $Q_1$ is proportional to the antilogarithm of the output signal from the light measuring circuit LMC.

When the voltage stored in the capacitor $C_2$ reaches the predetermined amount, the transistor $Q_2$ is brought into the non-conducting state thereby deenergizing the electromagnetic coil M and releasing the trailing curtain.

On the other hand, when the flash unit is coupled to the photographic camera and the capacitor Co is charged to the predetermined amount of voltage subsequent to closure of the switch $S_5$, the transistors $Q_3$, $Q_4$, $Q_5$, $Q_6$ and $Q_7$ are sequentially brought into the conducting state. Simultaneously with the conduction of the transistor $Q_5$, the indicator lamp L is lit to show the photographer that the voltage stored on the capacitor Co has attained the predetermined amount.

When the shutter is released during the conduction of the transistor $Q_7$ with the current supplied to the electromagnetic coil M through the transistor $Q_7$, the transistor $Q_2$ is brought into the conducting state by the supply of the high level output signal from the transistor control circuit TCC. In this condition, not only is the current flowing through the transistor $Q_7$ supplied to the electromagnetic coil M, but also the current flowing through the transistor $Q_2$ is supplied to the electromagnetic coil M. On the other hand, since the transistor $Q_6$ is brought into the conducting state simultaneously with the conduction of the transistor $Q_7$, the capacitor $C_2$ is charged not only by the current flowing through either the transistor $Q_1$ or the potentiometer VR depending on the position of the movable contact MC of the selection switch $S_3$, but also by the current flowing through the resistor $R_5$ so that the voltage stored on the capacitor $C_2$ can readily attain the predetermined amount prior to the closure of the synchro-switch X. Therefore, prior to the closure of the synchro-switch X, and subsequent to the time when the voltage on the capacitor $C_2$ reaches the predetermined amount, the output signal from the transistor control circuit TCC becomes a low level state and, therefore, the transistor $Q_2$ is switched off. The trailing curtain of the shutter is then retained in the cocked position by the energization of the electromagnetic coil effected by the supply of current through the transistor $Q_7$. By thus controlling the energization of closing means electromagnetic coil M, transistor $Q_7$ comprises a closing control means.

Subsequent to a complete depression of the shutter release button, the synchro-switch X is closed and the trigger circuit ($C_3$ and T) of the flash system is consequently actuated to allow the electric energy in the main capacitor Co to be discharged through the discharge flash-tube F.

Simultaneously with the discharge of the flashtube F, the voltage between the opposite poles of the main capacitor Co quickly falls below the predetermined value and, therefore, the transistors $Q_3$, $Q_4$, $Q_5$, $Q_6$ and $Q_7$ are sequentially switched off. Consequently, not only is the indicator lamp L deenergized, but also the electromagnetic coil M is also deenergized to allow the trailing curtain, which has been retained in the cocked position, to move towards the released position thereby completing exposure of the photosensitive film to the incoming light carrying the image of the target object to be photographed. In other words, the shutter is closed in response to the discharge of the flash-tube F. In the embodiment illustrated in FIG. 1, resistor $R_5$ and transistor $Q_6$ operate as a shutter closing inhibit means inhibiting the first switching circuit from closing the shutter. In addition, closing control means transistor $Q_7$ operates as a second control means similar to the first control means $Q_2$ by deenergizing electromagnetic coil M to release the trailing curtain when capacitor Co is discharged.

In a second embodiment of the present invention shown in FIG. 3, the possibility of the electromagnetic coil M being energized by the respective currents flowing through the transistors $Q_2$ and $Q_7$ in the foregoing embodiment of FIG. 1 is substantially eliminated. For this purpose, instead of employing the switching transistor $Q_6$ and the resistor $R_5$ in the foregoing embodiment, a delay circuit, composed of a series connected resistor $R_6$ and capacitor $C_4$, a switching transistor $Q_8$ for short-circuiting the capacitor $C_4$ and a switching transistor $Q_9$ for interrupting the supply of the current through the transistor $Q_2$ to the electromagnetic coil M are employed.

The delay circuit ($R_6$ and $C_4$) is connected across the power source E, the junction between the elements $R_6$ and $C_4$ being connected to the base of the transistor $Q_9$. Transistor $Q_9$ has an emitter connected to the collector of the transistor $Q_2$ and a collector connected to the electromagnetic coil M, and also to the collector of the transistor $Q_8$. Transistor $Q_8$ has a base connected to the junction between the resistors $R_3$ and $R_4$ and an emitter connected to the negative bus NB.

It will readily be seen that, when and so long as the transistor $Q_8$ is switched off, the transistor $Q_9$ is held in a conducting state thereby allowing current to flow through the transistor $Q_2$ and to be supplied to the electromagnetic coil M. As hereinbefore described in connection with the embodiment of FIG. 1, the transistor $Q_2$ continues to conduct for the period of time during which the capacitor $C_1$ changes to the predetermined voltage, that is, so long as the output signal from the transistor control circuit TCC is in the low level state.

However, when the transistor $Q_8$ conducts which takes place simultaneously with the conduction of the transistor $Q_4$ and which results in the shortcircuiting the capacitor $C_4$ the potential applied to the base of the transistor $Q_9$ is lowered so that the transistor $Q_9$ is brought into a non-conducting state. Therefore, even if the transistor $Q_2$ is in the conducting state at the time the transistor $Q_8$ is brought into the conducting state, no current is supplied to the electromagnetic coil M through the transistor $Q_9$. In other words, the transistor $Q_9$ when in the non-conducting state interrupts the supply of the current flowing through the transistor $Q_2$ to the electromagnetic coil M. It is, therefore, clear that the electromagnetic coil M is energized only by the current supplied through the transistor $Q_7$. Thus in the embodiment illustrated in FIG. 3, capacitor $C_4$, resistor $R_6$ and transistors $Q_8$ and $Q_9$ operate as the shutter closing inhibit means and closing control means transistor $Q_7$ operates as a second control means.

In the embodiments of FIGS. 1 and 3, the exposure control system including the first and second switching circuits has been described as incorporated in the photographic camera. However, some of the circuit elements of the second switching circuit may be incorporated in the flash unit, which will now be described with particular reference to FIGS. 4 and 5.

Figure 4:
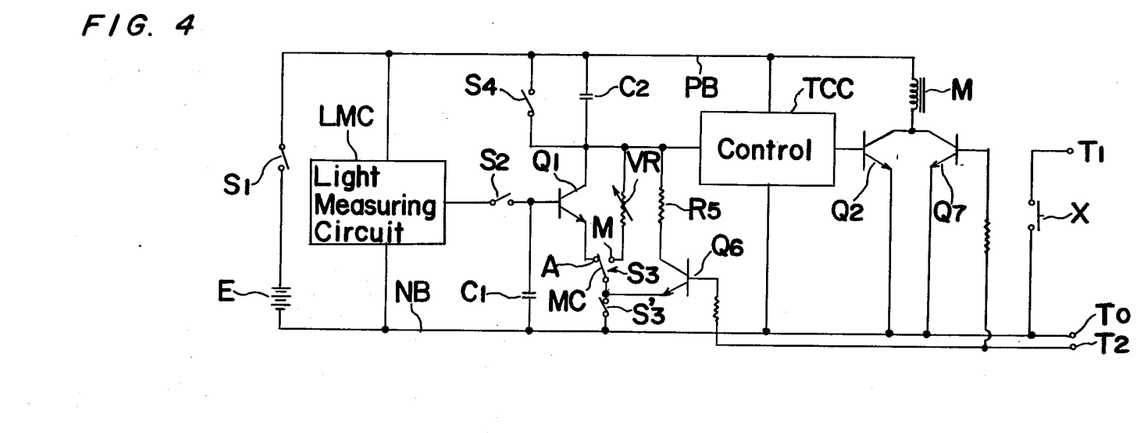
FIG. 4 is a circuit diagram of a third embodiment of the flash exposure control system.
Figure 5:
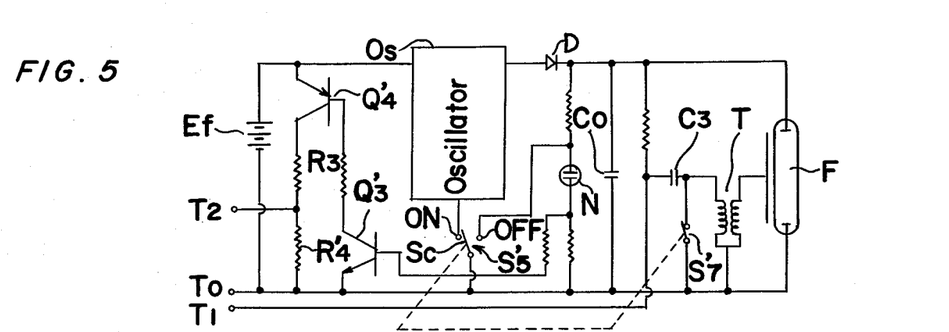
FIG. 5 is a circuit diagram of another example of the flash system of the flash device which can be utilizable with the system shown in FIG. 4.

Shown in FIG. 5 is another example of a flash system utilizable in combination with not only the exposure control system shown in FIG. 4, but also with any one of exposure control systems shown in FIGS. 6 to 10, respectively.

Referring now to FIG. 5, the flash system includes transistors $Q'_2$ and $Q'_4$ and resistors $R'_3$ and $R'_4$. These elements $Q'_3$, $Q'_4$, $R'_3$ and $R'_4$ correspond in function to the elements $Q_3$, $Q_4$, $R_3$ and $R_4$ which are employed in the exposure control system shown in FIG. 1. On the other hand, the exposure control system shown in FIG. 4 is not provided with the elements $R_1$, $R_2$, $R_3$, $R_4$, $Q_3$, $Q_4$, $Q_5$ and L as employed in the control system of FIG. 1.

For operatively connecting the system of FIG. 5 to the system of FIG. 4 when the flash unit is coupled to the photographic camera, the flash housing has an additional terminal $t_2$ on the one hand and the photographic camera has also an additional control terminal $T_2$. It will readily be seen that, when the terminals $t_2$ and $T_2$ are connected to each other simultaneously with connection between the terminals to and $t_1$ to the associated synchro-terminals To and $T_1$, the junction between the resitors $R'_3$ and $R'_4$ is electrically connected to the base of the transistor $Q_7$ and also to the base of the transistor $Q_6$ in a manner similar to the connection between the junction of resistors $R_3$ and $R_4$ and the base of transistor $Q_7$ shown in FIG. 1.

Still referring to FIG. 5, the terminal $t_1$, which has been described as connected to the capacitor $C_3$ through the switch $S_7$ in the example shown in FIG. 2, is connected to the junction between the capacitor $C_3$ and a suitable resistor while the switch $S'_7$, corresponding in function to the switch $S_7$ shown in FIG. 2, is inserted between the capacitor $C_3$ and the trigger coil T. The switch $S'_5$, corresponding in function to the switch $S_5$ shown in FIG. 2, has a pair of fixed contacts ON and OFF and a movable contact Sc, the movable contact Sc being operatively associated with the switch $S'_7$ so that, when the movable contact Sc is engaged to the fixed contact OFF, the switch $S'_7$ is opened.

The transistor $Q'_3$ employed in the flash system of FIG. 5 can be switched on in response to the discharge of voltage through a neon tube N having a positive terminal connected to the cathode of the rectifying diode D through a suitable resistor and a negative terminal connected to the negative terminal of the power source Ef through a suitable resistor. As is well known to those skilled in the art, the discharge of voltage through the neon tube N takes place when the voltage stored in the capacitor Co attains the predetermined value. This neon tube N when lit by the discharge of voltage therethrough serves a purpose similar to that achieved by the indicator lamp L employed in the control system of FIG. 1.

It will readily be seen that the system of FIG. 4 combined with the system of FIG. 5 functions in a manner substantially similar to the function of the system of FIG. 1 combined with the system of FIG. 2.

Like the system of FIG. 1, the system of FIG. 4 has the possibility that the electromagnetic coil M is energized by the currents flowing through the respective transistors $Q_2$ and $Q_7$, during a relatively short period of time during which the capacitor $C_2$ is charged sufficient to cause the output signal from the transistor control circuit TCC to be converted from the high level state into the low level state. An exposure control system substantially eliminating the above described possibility, but which is utilizable in combination with the flash system of FIG. 5 is shown in FIG. 6.

Figure 6:
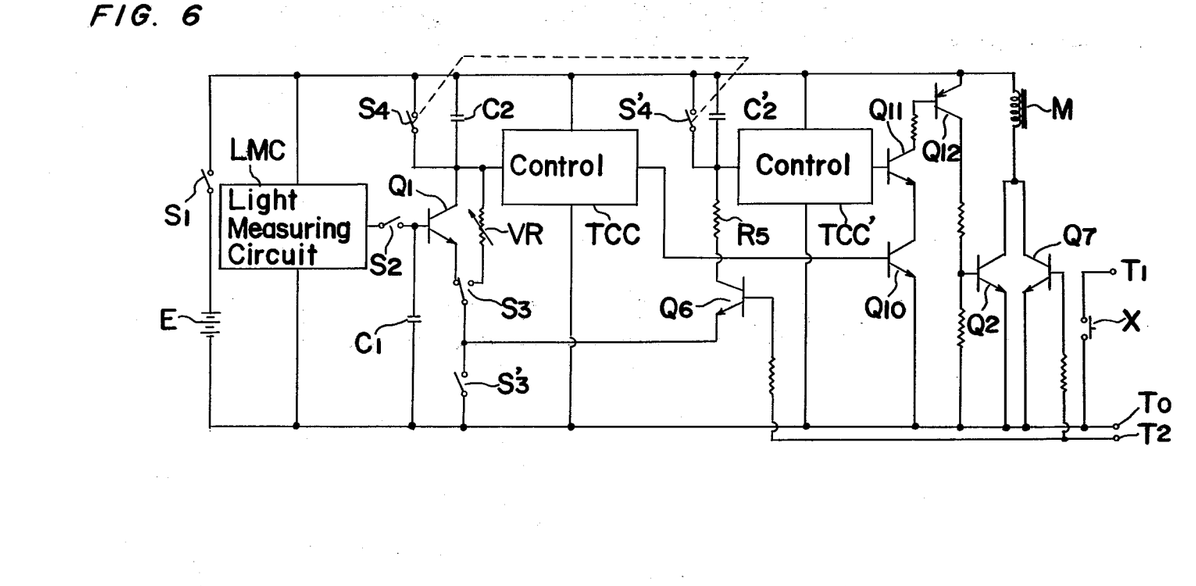
FIGS. 6 to 10 are circuit diagrams showing fourth to eighth embodiments, respectively, of the flash exposure control system utilizable with the flash system shown in FIG. 5.

Referring now to FIG. 6, there is shown a third embodiment of the present invention wherein means for switching the transistor $Q_2$ off in response to conduction of the transistor $Q_7$ is substantially constituted by a circuit including the elements designated by $S'_4$, $C'_2$ and TCC' which are similar in construction and performance to the switch $S_4$, the capacitor $C_2$ and the transistor control circuit TCC, respectively. In the system of FIG. 6, the transistor $Q_6$ has its collector connected to the junction between the parallel circuit ($S'_4$ and $C'_2$) and the transistor control circuit TCC' through the resistor $R_5$ and its emitter connected in the manner as shown in FIG. 4. An AND gate substantially composed of switching transistors $Q_{10}$, $Q_{11}$ and $Q_{12}$ is employed to control the operation of the transistor $Q_2$ in a manner as will now be described.

With the exposure control circuit of FIG. 6 combined with the flash unit of FIG. 5, during any one of the above described conditions (1), (2) and (3), the transistors $Q_6$ and $Q_7$ are in the non-conducting state on the one hand and the transistor control circuits TCC and TCC' generate the high level signals respectively to the bases of the transistors $Q_{10}$ and $Q_{11}$ on the other hand. Therefore, the transistors $Q_{10}$ and $Q_{11}$ are in a conducting state before the voltage stored on the capacitors $C_2$ and $C'_2$ attain their respective predetermined values, which in turn results in conduction of the transistor $Q_{12}$. Consequently, the transistor $Q_2$ is in the conducting state and the electromagnetic coil M is therefore energized to retain the trailing curtain in the cocked position during the predetermined time substantially equal to the time required for the capacitor $C_2$ to be charged to the predetermined voltage.

When the voltage stored on the capacitor $C_2$ reaches the predetermined amount, the output signals from the transistor control circuit TCC is brought into the low level state and, therefore, the transistor $Q_{10}$ is switched off. It is to be noted that, even if the switch $S'_4$ is opened simultaneously with the switch $S_4$, no voltage is charged on the capacitor $C'_2$ because of non-conduction of the transistor $Q_6$ and, therefore, the transistor control circuit TCC' continues to generate the high level output signal.

Even though the transistor $Q_{11}$ is in the conducting state by the supply of the high level output signal from the transistor control circuit TCC', the switching-off of the transistor $Q_{10}$, which takes place in the manner as hereinabove described, results in the transistor $Q_2$ being brought into the non-conducting state. The consequence is that the trailing curtain which has been retained in the cocked position while the electromagnetic coil M remained energized is allowed to move from the cocked position towards the released position thereby completing the exposure of the photosensitive film to the incoming light.

However, when the transistors $Q_6$ and $Q_7$ are simultaneously brought into the conducting state when the voltage stored on the capacitor Co reaches the predetermined amount, the opening of the switch $S'_4$ in association with the switch $S_4$ results in charging of the capacitor $C'_2$ and, therefore, when the capacitor $C'_2$ is charged to the predetermined amount of voltage, the output signal from the control circuit TCC' becomes the low level state and, therefore, the transistor $Q_{11}$ is switched off irrespective of whether the output signal from the transistor control circuit TCC is in the high level state or whether the output signal from the transistor control circuit TCC is in the low level state. The consequence is that the electromagnetic coil M is energized only by the current flowing through the transistor $Q_7$ after the transistor $Q_2$ has been switched off and before the flash-tube F is triggered on. Thus in the embodiment illustrated in FIG. 6, capacitor $C'_2$, resistor $R_5$, transistor control circuit TCC' and transistors $Q_6$, $Q_{11}$ and $Q_{12}$ operate as the shutter closing inhibit means and closing control means transistor $Q_7$ above operates as a second control means.

Figure 7:
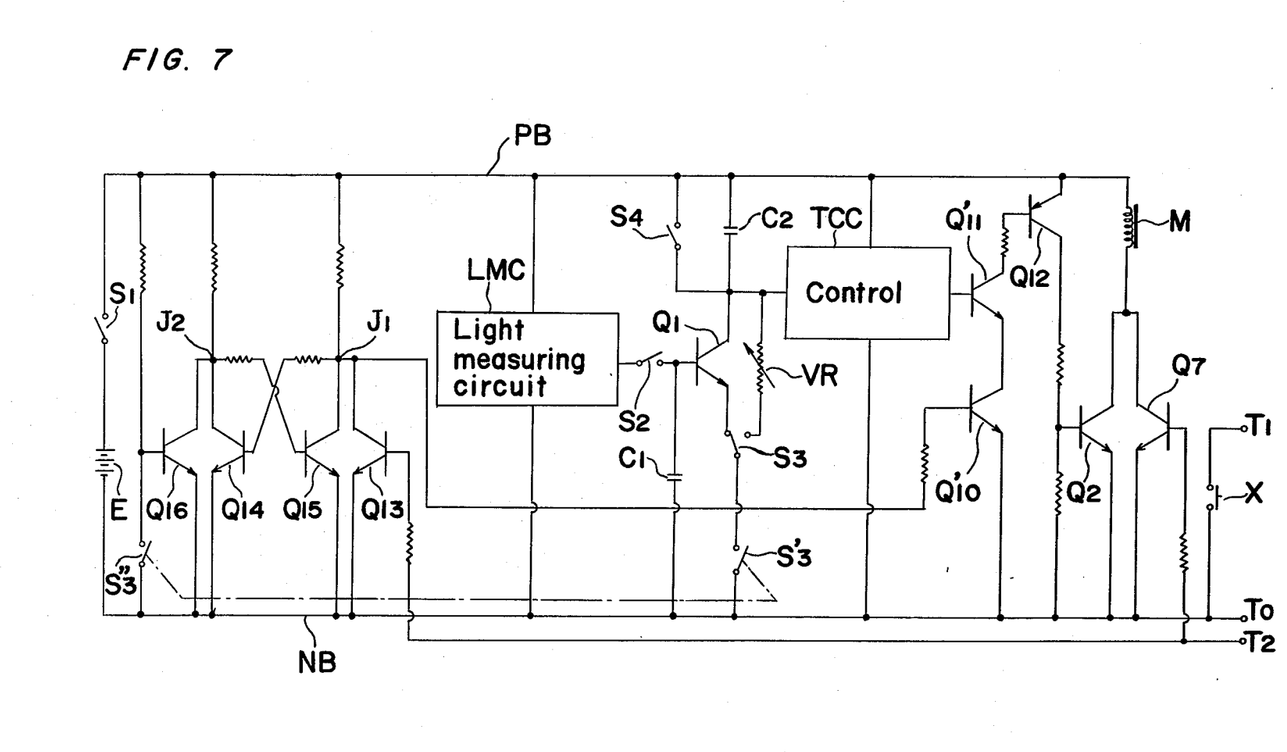

In a fourth embodiment of the present invention shown in FIG. 7, a flip-flop circuit is utilized to control the operation of the transistor $Q_2$ in a manner similar to that shown in FIG. 6.

Referring now to FIG. 7, a transistor $Q'_{11}$, similar in construction and function to the transistor $Q_{11}$, has a base connected to the output terminal of the transistor control circuit TCC, a collector connected to the base of the transistor $Q_{12}$ through a suitable resistor and an emitter connected to the collector of a transistor $Q'_{10}$ which is similar in construction and function to the transistor $Q_{10}$. The flip-flop circuit substantially includes switching transistors $Q_{13}$, $Q_{14}$, $Q_{15}$ and $Q_{16}$. The transistor $Q_{13}$ has a base connected to the control terminal $T_2$ through a suitable resistor to which the base of the transistor $Q_7$ is also connected through a suitable resistor. The collector of the transistor $Q_{13}$ is connected to the base of the transistor $Q'_{10}$ through a suitable resistor and to the junction $J_1$ between the collector of the transistor $Q_{15}$ and a suitable resistor whose other terminal is connected to the positive bus PB. The emitter of transistor $Q_{13}$ is connected to the negative bus NB. The transistors $Q_{14}$ and $Q_{15}$ are connected in a known manner and are arranged so that, when a high level signal appears at the junction $J_1$, the transistor $Q_{14}$ is switched on and the transistor $Q_{15}$ is switched off by the supply of a low level signal appearing at a junction $J_2$ between a suitable resistor whose other terminal is connected to the positive bus PB and the collector of the transistor $Q_{14}$. The transistor $Q_{16}$ has a collector connected to the junction $J_2$, an emitter connected to the negative bus NB, and a base connected to the negative bus NB through a switch $S''_3$ and to the positive bus through a suitable resistor. The switch $S''_3$ is operatively associated with the switch $S'_3$ so that closure of the switch $S'_3$, which is effected upon release of the shutter, results in closure of the switch $S''_3$.

The flip-flop circuit of the construction shown in FIG. 7 operates in a manner as will now be described.

During any one of the above described conditions (1), (2) and (3) and unless switch $S''_3$ is closed in association with the switch $S'_3$, no biasing voltage is applied to the base of the transistor $Q_{13}$ and, therefore, the latter is switched off. On the other hand, because of the opening of the switch $S''_3$, a voltage across a suitable resistor inserted between the positive bus PB and the base of the transistor $Q_{16}$ is applied to the base of the transistor $Q_{16}$ to switch the latter on. In this condition, the voltage appearing at the junction $J_2$ is in a low level state and, therefore, the transistor $Q_{15}$ is switched off. Since the transistors $Q_{13}$ and $Q_{15}$ are switched off, the voltage at the junction $J_1$ is in a high level state and is applied in part to the base of the transistor $Q_{14}$ to switch the latter on and in part to the base of the transistor $Q'_{10}$ to switch the latter on. Conduction by the transistor $Q'_{10}$ results in energization of the electromagnetic coil M by the supply of the current flowing through the transistor $Q_2$ in a manner as described in connection with the foregoing embodiment of FIG. 6.

Still during any one of the above described conditions (1), (2) and (3), subsequent closure of the switch $S''_3$ together with the closure of the switch $S'_3$ in response to the shutter release brings the transistor $Q_{16}$ into a non-conducting state. Even though the transistor $Q_{16}$ no longer conducts, the state of the flip-flop circuit does not change since the transistor $Q_{14}$ has been switched on as described above. Therefore, the transistor $Q'_{10}$ is maintained in the conducting state to allow the current flowing through the transistor $Q_2$ to be applied to the electromagnetic coil M to energize the latter.

However, when the flash unit is coupled to the photographic camera with the terminals to, $t_1$ and $t_2$ respectively connected to the synchro-terminals To, $T_1$ and control terminal $T_2$, after the voltage stored on the capacitor Co has attained the predetermined amount, but before the switch $S''_3$ has been closed, the transistor $Q_{13}$ is brought into a conducting state by the supply of a high level voltage from the terminal $T_2$ to the base of transistor $Q_{13}$ and the transistor $Q_{16}$ is brought into a conducting state as described above. In this condition, the respective voltages at the junctions $J_1$ and $J_2$ are in low level states. When the switching transistor $Q_{13}$ conducts, a low level voltage at the junction $J_1$ is applied to the base of the transistor $Q'_{10}$ to switch the latter off, the consequence of which is that, irrespective of the state of the output signal produced by the transistor control circuit TCC, the electromagnetic coil M is energized only by the current flowing through the transistor $Q_7$ which has been switched on by the supply of high level voltage at the terminal $T_2$ to the base of the transistor $Q_7$.

When the switch $S''_3$ is closed in the manner as hereinbefore described while a high level voltage is applied to the control terminal $T_2$ from the flash system, that is, after the voltage stored on the capacitor Co has attained the predetermined amount in readiness for the actual taking of a photographic picture under flash lighting conditions, the transistor $Q_{16}$ is switched off on the one hand and the transistors $Q_7$ and $Q_{13}$ are maintained in the conducting states on the other hand. In this condition, since the conduction of the transistor $Q_{13}$ brings the voltage at the junction $J_1$ into the low level state, the transistor $Q_{14}$ is switched off bringing the voltage at the junction $J_2$ into the high level state and the transistor $Q'_{10}$ is switched off. Consequently, irrespective of the state of the output signal emerging from the transistor control circuit TCC, the electromagnetic coil M is energized only by the current flowing through the transistor $Q_7$.

After the actual taking of the photographic picture under flash lighting conditions, that is, when the synchro-switch X is closed subsequent to the closure of the switch $S''_3$, the voltage stored on the capacitor Co is discharged through the flash-tube F to illuminate the target object to be photographed. Upon firing of the flash-tube F, the voltage at the terminal $t_2$, which is then connected to the control terminal $T_2$, becomes a low level state and, therefore, the transistor $Q_7$ is switched off to allow the trailing curtain, which has been retained in the cocked position by the energization of the coil M, to move towards the released position thereby completing the exposure of the photosensitive film to the incoming light carrying the image of the target object.

The flip-flop circuit shown in FIG. 7 may be employed in the exposure control system shown in FIG. 4 to control the operation of the transistor $Q_6$. This will now be described with reference to FIG. 8, in which a fifth embodiment of the present invention is shown.

Figure 8:
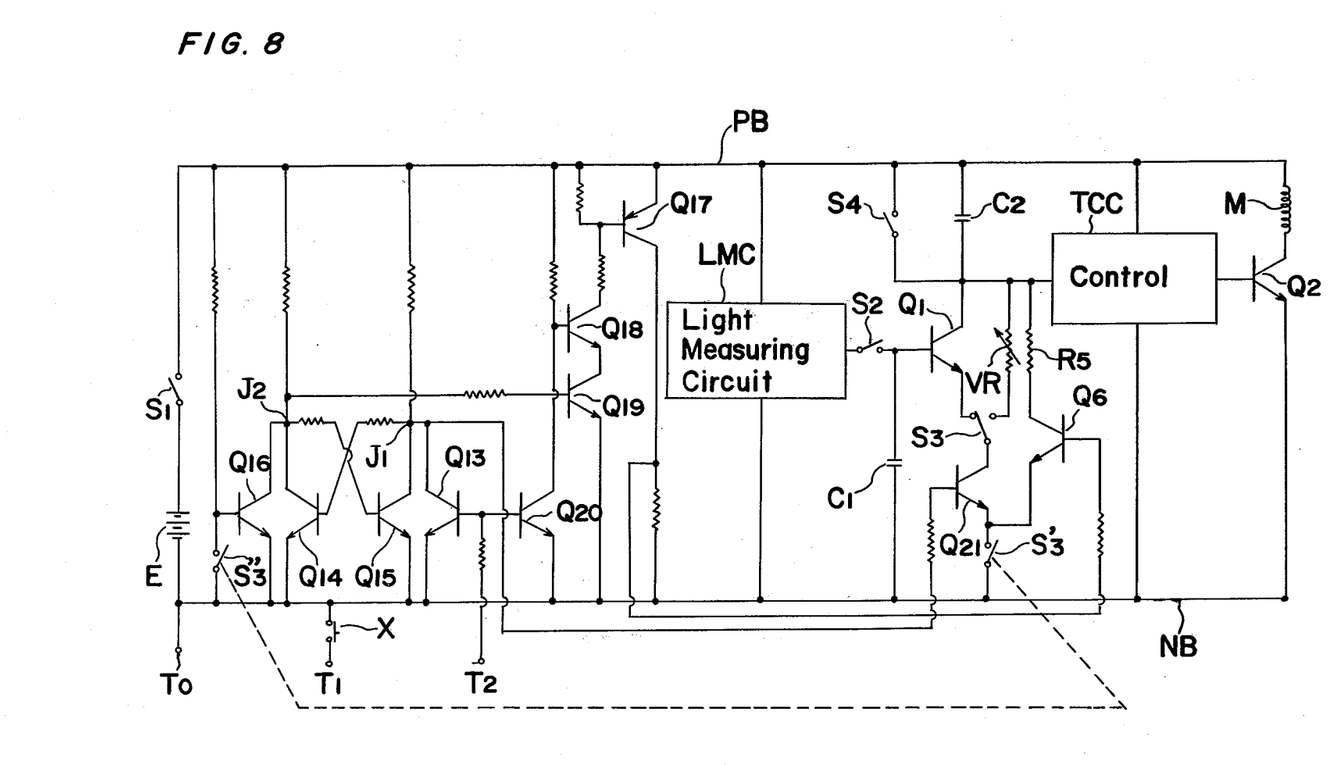

Referring to FIG. 8, the base of the transistor $Q_6$ is shown to be connected to the collector of a switching transistor $Q_{17}$ which is also connected to the negative bus NB through a suitable resistor. The switching transistor $Q_{17}$ has an emitter connected to the positive bus PB and a base connected to the collector of a switching transistor $Q_{18}$ through a suitable resistor. The transistor $Q_{18}$ has an emitter connected to the collector of a switching transistor $Q_{19}$ and a base connected to the positive bus PB through a suitable resistor and to the collector of a switching transistor $Q_{20}$.

The transistor $Q_{19}$ has an emitter connected to the negative bus NB and a base connected through a suitable resistor to the junction $J_2$ so that, when the voltage at the junction $J_2$ is in the high level state, the transistor $Q_{19}$ is switched on. The transistor $Q_{20}$ has an emitter connected to the negative bus NB and a base connected to the base of the transistor $Q_{13}$ so that the transistor $Q_{20}$ is brought into a conducting state simultaneously with conduction of the transistor $Q_{13}$.

It is to be noted that the transistors $Q_{17}$, $Q_{18}$ and $Q_{19}$ substantially constitute an AND gate circuit and the transistor $Q_{20}$ substantially constitutes an inverting circuit. In addition, note that, in the embodiment shown in FIG. 8, no transistor is employed which is operable in a substantially reversed relation to the transistor $Q_2$, such as designated by $Q_7$ in FIG. 6.

The exposure control system shown in FIG. 8 operates in the following manner.

During any one of the above described conditions (1), (2) and (3) and unless the switches $S'_3$ and $S''_3$ are closed, no biasing voltage is applied to the base of the transistor $Q_{13}$ and, therefore, the latter is switched off. On the other hand, because of the opening of the switch $S''_3$, the voltage across a suitable resistor inserted between the positive bus PB and the base of the transistor $Q_{16}$ is applied to the base of the transistor $Q_{16}$ to switch the latter on. In this condition, the voltage appearing at the junction $J_2$ is in a low level state and, therefore, the transistor $Q_{15}$ is switched off on the one hand and the transistor $Q_{19}$ is switched off on the other hand. Since the transistors $Q_{13}$ and $Q_{15}$ are simultaneously switched off, the voltage at the junction $J_1$ is in a high level state. This voltage is applied in part to the base of the transistor $Q_{14}$ to switch the latter on and in part to the base of the transistor $Q_{21}$. At this time, since the switch $S'_3$ is still opened, the transistor $Q_{21}$ is, even though the high level voltage is applied to the base thereof from the junction $J_1$, switched off. Therefore, the transistor control circuit TCC generates the high level output signal which is in turn applied to the transistor $Q_2$ to switch the latter on whereby the electromagnetic coil M is energized to retain the trailing curtain at the cocked position together with the leading curtain.

Simultaneously with the start of movement of the leading curtain from the cocked position towards the released position, independently of the trailing curtain, in response to the subsequent shutter release, the switches $S'_3$ and $S''_3$ are both closed. Upon closure of the switches $S'_3$ and $S''_3$, the transistor $Q_{13}$ is still in the non-conducting state and the transistor $Q_{16}$ is brought into a non-conducting state. This does not affect the operative state of the flip-flop circuit and, therefore, the respective voltages at the junctions $J_1$ and $J_2$ are in the high and low level states. The consequence is that the high level voltage at the junction $J_1$ is applied to the base of the transistor $Q_{21}$ to switch the latter on while the low level voltage at the junction $J_2$ is applied to the base of the transistor $Q_{19}$ to switch the latter off. Accordingly, irrespective of the state of the transistor $Q_{18}$, the switching-off of the transistor $Q_{19}$ results in non-conduction of the transistor $Q_{17}$ which in turn results in non-conduction of the transistor $Q_6$.

Therefore, the capacitor $C_2$ can be charged by the current flowing through either the transistor $Q_1$ or the potentiometer VR depending on the position of switch $S_3$. When the voltage stored on the capacitor $C_2$ attains the predetermined amount, the control circuit TCC generates a low level output signal to the base of the transistor $Q_2$ to deenergize the electromagnetic coil M, thereby allowing the trailing curtain to move towards the released position.

However, when the flash unit is coupled to the photographic camera with the terminals to, $t_1$ and $t_2$ respectively connected to the synchro-terminals To, $T_1$ and control terminal $T_2$, after the voltage stored on the capacitor Co has attained the predetermined amount but before the switches $S'_3$ and $S''_3$ have been closed, the transistor $Q_{13}$ is brought into a conducting state and the voltage at the junction $J_1$ becomes a low level state. Similarly, transistor $Q_{20}$ is also brought into a conducting state. On the other hand, since the switch $S''_3$ is opened, the transistor $Q_{16}$ is still in the conducting state and the voltage at the junction $J_2$ is maintained in the low level state.

Upon closure of the switches $S'_3$ and $S''_3$ in response to the opening of the shutter while the voltage at the control terminal $T_2$ is in the high level state, the transistors $Q_{13}$ and $Q_{20}$ remain switched on. Therefore, while the voltage at the junction $J_1$ does not vary and is maintained in the low level state, the transistor $Q_{18}$ is switched off in view of the conduction of the transistor $Q_{20}$.

On the other hand, since the switch $S''_3$ is closed, the transistor $Q_{16}$ is switched off and the voltage at the junction $J_2$ becomes a high level state, which results in switching on of the transistor $Q_{19}$. Because the transistor $Q_{18}$ is switched off, the transistors $Q_{17}$ and $Q_6$ are both switched off irrespective of the conduction of the transistor $Q_{19}$. The transistor $Q_{21}$ is still in the non-conducting state because of the low level voltage at the junction $J_1$.

After the synchro-switch X is closed to allow the flash device to be fired to illuminate the target object to be photographed, the voltage at the control terminal $T_2$ suddenly becomes a low level state and the transistor $Q_{20}$ is switched off. The consequence is that the transistors $Q_{18}$, $Q_{17}$ and $Q_6$ are sequentially switched on so that the capacitor $C_2$ can be charged by the current flowing through the resistor $R_5$. therefore, it is clear that, after the voltage stored on the capacitor $C_2$ has attained the predetermined amount, the electromagnetic coil M becomes deenergized to allow the trailing curtain to move towards the released position.

In the embodiment illustrated in FIG. 8, transistors $Q_6$ and $Q_{21}$ serve to control the charging rate of capacitor $C_2$. When the flash unit is not connected transistor $Q_6$ is off and transistor $Q_{21}$ is on, thus the charging rate of capacitor $C_2$ is determined by the current carried by transistor $Q_1$ or potentiometer VR depending on the position of switch $S_3$. When the flash unit is connected and the energy stored in capacitor $C_o$ exceeds the predetermined value, transistor $Q_{21}$ is turned off, thereby increasing the time of the time determining circuit $C_2$ and $Q_1$ or VR to infinity by preventing $C_2$ from charging. When the energy stored on capacitor $C_o$ falls below the predetermined value by discharge through the flash tube, transistors $Q_6$ and $Q_{21}$ are both turned on and $C_2$ is charged through the parallel combination of $Q_1$ or VR and $R_5$, thereby decreasing the time of the time determining circuit.

In view of the above explanation of the embodiment illustrated in FIG. 8, it can be readily seen that transistor $Q_{21}$ is a means for disabling the time determining means and for preventing the generation of a shutter closing signal to transistor $Q_2$. In addition, transistor $Q_6$ and resistor $R_5$ comprise means for causing the time determining means to generate a shutter closing signal to transistor $Q_2$ when the voltage across capacitor $C_o$ falls below the predetermined value.

Figure 9:
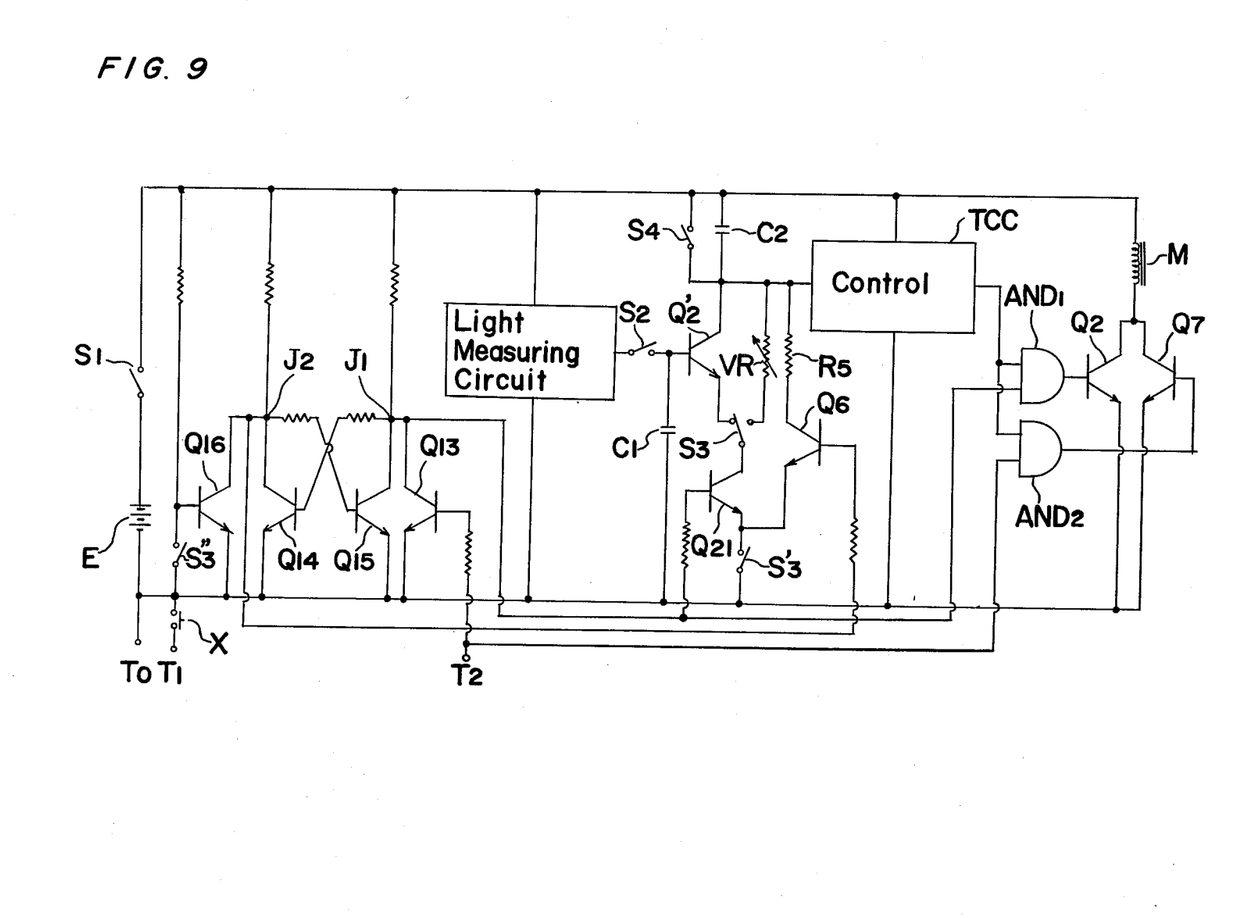

According to a sixth embodiment shown in FIG. 9 AND gates $AND_1$ and $AND_2$ are employed for operating the transistors $Q_2$ and $Q_7$ in a substantially reversed relation to each other by the use of the flip-flop circuit.

Referring now to FIG. 9, the AND gate $AND_1$ has first and second input terminals respectively connected to the output terminal of the transistor control circuit TCC and the junction $J_1$ and an output terminal connected to the base of the transistor $Q_2$. The AND gate $AND_2$ has first and second input terminals respectively connected to the output terminal of the control circuit TCC and the control terminal $T_2$ and an output terminal connected to the base of the transistor $Q_7$.

With this construction, when the voltage at the terminal $T_2$ is at a low level, the voltage at the junction $J_1$ is at a high level and, accordingly, the transistor $Q_{21}$ is brought in position ready to conduct in a similar manner to the embodiment of FIG. 8. In addition, since the voltage at the junction $J_1$ is at the high level as described above, the AND gate $AND_1$ causes the transistor $Q_2$ to conduct when the output signal from the control circuit TCC is a high level voltage. On the other hand, the AND gate $AND_2$ cannot cause the transistor $Q_7$ to conduct so long as the voltage at the terminal $T_2$ is at a low level, and therefore the transistor $Q_7$ does not participate in operation of the circuit during the period in which the voltage at the terminal $T_2$ is at the low level. For the reasons stated above, when the voltage at the terminal $T_2$ is at the low level, the electromagnetic coil M is controlled according to the output from the light measuring circuit LMC in a manner similar to the embodiment of FIG. 8.

However, when the voltage at the terminal $T_2$ is at a high level, the voltage at the junction $J_1$ becomes a low level voltage and, therefore, the transistor $Q_{21}$ is in a non-conductive state as is the case in the embodiment of FIG. 8. Therefore, so long as the transistor $Q_6$ is in the non-conductive state, the circuit TCC generates a high level voltage. On the other hand, since the voltage at the junction $J_1$ is at a low level voltage, the AND gate $AND_1$ cannot cause the transistor $Q_2$ to conduct and, therefore, the transistor $Q_2$ does not participate in operation of the circuit. However, the gate $AND_2$ causes the transistor $Q_7$ to conduct since the voltage at the terminal $T_2$ is at a high level. When the voltage at the terminal $T_2$ becomes a low level voltage and subsequent to the discharge of the flash-tube F, the AND gate $AND_2$ causes the transistor $Q_7$ to be in a non-conductive state with the electromagnetic coil M consequently deenergized to cause the trailing shutter curtain to move.

The operation described above can readily be understood from the description, concerning the operation of the circuit according to the embodiment of FIG. 8, and the electrical connections of the AND gates $AND_1$ and $AND_2$ and transistors $Q_2$ and $Q_7$ shown in FIG. 9 and is obvious to those skilled in the art.

Note that, in the embodiment of FIG. 9, the base of the transistor $Q_6$ is connected to the junction $J_2$ through a suitable resistor and that the switches $S'_3$ and $S''_3$ are not operatively associated. Note, since the switch $S''_3$ has the same function as in the embodiment of FIG. 8, the switch $S''_3$ shown in FIG. 9 is constructed to close shortly before the voltage at the terminal $T_2$ becomes a low level voltage incident to the discharge of the flash-tube F as can readily be understood from the description of the operation of the switch $S''_3$ in the embodiment of FIG. 8. Accordingly, so far as the operation of switch $S''_3$ in the manner described is concerned, this switch may be so designed as to be closed in association with any suitable means.

In the embodiment shown in FIG. 8, since the base of the transistor $Q_6$ is connected to the collector of the transistor $Q_{17}$, when the voltage at the terminal $T_2$ remains at a high level due to the failure of the flash-tube F to discharge, the transistor $Q_{19}$ remains non-conductive and, accordingly, the transistor $Q_{17}$ remains non-conductive. Therefore, the transistor $Q_6$ does not conduct and the output from the circuit TCC remains at a high level voltage, consequently the shutter fails to close.

On the contrary, in the embodiment shown in FIG. 9, since the base of the transistor $Q_6$ is connected to the junction $J_2$, the transistor $Q_6$ conducts when the voltage at the junction $J_2$ become a high level voltage upon closure of the switch $S''_3$. Accordingly, subsequent to conduction of the transistor $Q_6$ and after a predetermined period of time determined by the time constant ($R_5$ and $C_2$) has passed, the output from the circuit TCC becomes a low level. This operation can readily be understood from the fact that the base of the transistor $Q_6$ is connected to the junction $J_2$ as shown in FIG. 9 and is obvious to those skilled in the art.

The exposure control system shown in FIG. 9 operates in a manner substantially similar to the exposure control system shown in FIG. 8, except that the transistors $Q_2$ and $Q_7$ are respectively controlled by the AND gates $AND_1$ and $AND_2$. However, note that the resistor $R_5$ employed in the system of FIG. 9 is different from that employed in the system of FIG. 8. Specifically, while the resistor $R_5$ employed in the system of FIG. 8 has a relatively low resistance so that, upon conduction of the transistor $Q_6$, the capacitor $C_2$ can readily be charged, the resistor $R_5$ employed in the system of FIG. 9 has a relatively high resistance so that the exposure time determined by the time constant characteristic of the time constant circuit ($R_5$ and $C_2$) has a value greater than the time corresponding to the shutter speed synchronized with the flash duration of the flash device. With the system of FIG. 9, even if the flash-tube F fails to discharge, subsequent to the shutter release, while the voltage at the control terminal $T_2$ remains at the high level state, the shutter can be closed since the output signal from the control circuit TCC becomes a low level state after the time determined by the time constant circuit ($R_5$ and $C_2$) has passed and consequently the transistor $Q_7$ is switched off by the function of AND gate $AND_2$.

Figure 10:
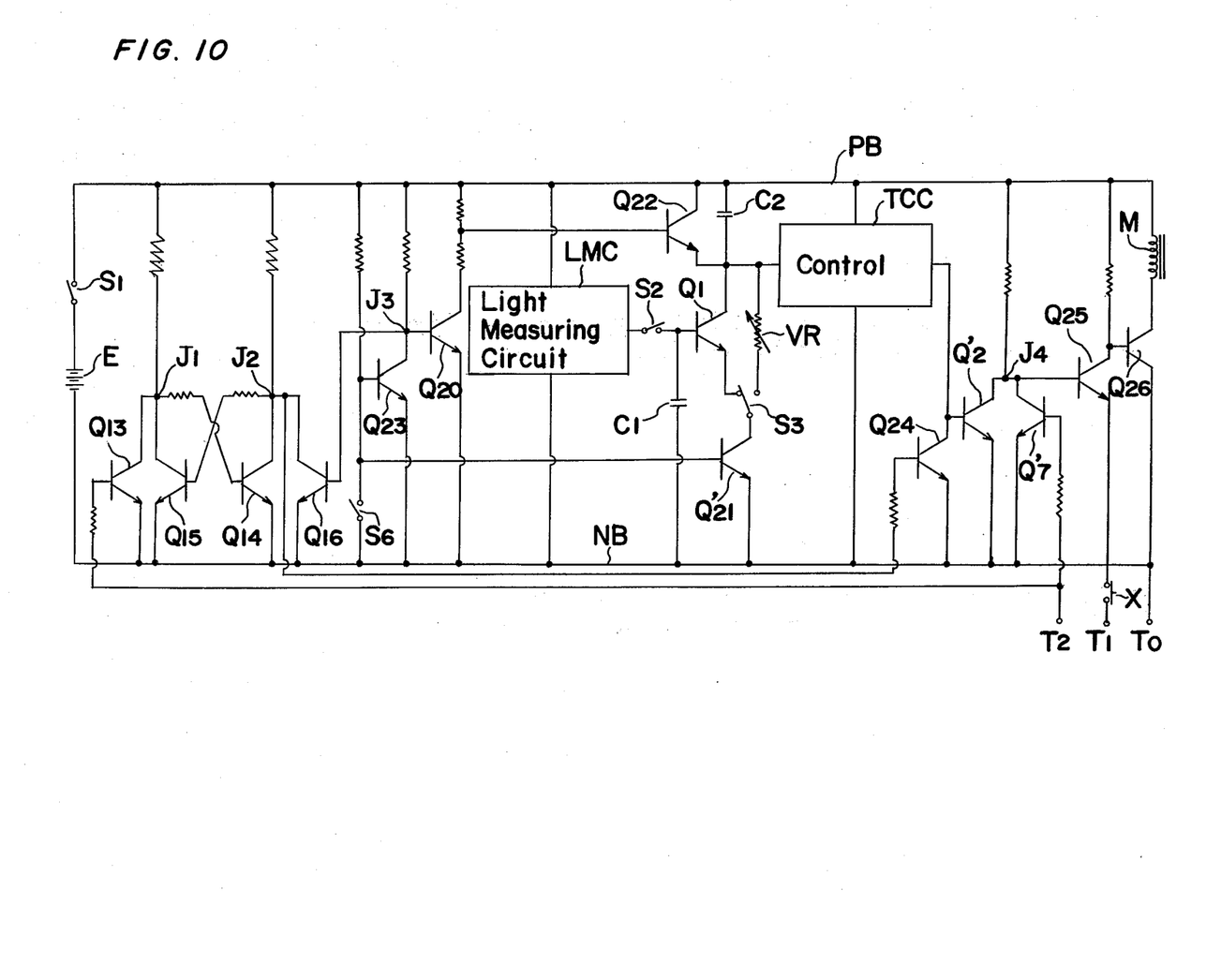

The circuit shown in FIG. 10 is advantageous in that the number of mechanical switches required in the exposure control system can be minimized which in turn substantially eliminates complicated mechanical interlinkage system for operating such switches in association with the shutter mechanism.

Referring now to FIG. 10, instead of the switch $S_4$ employed in the foregoing embodiments, a switching transistor $Q_{22}$ is employed. This transistor $Q_{22}$ has an emitter-collector path connected in parallel to the capacitor $C_2$ and a base connected to the positive bus PB through a suitable resistor and to the collector of a switching transistor $Q_{20}$ through a suitable resistor. The transistor $Q_{20}$ has an emitter connected to the negative bus NB and a base connected to the base of the transistor $Q_{16}$. A switch $S_6$, which is opened in response to or in association with the start of movement of the leading curtain, which has been held in the cocked position together with the trailing curtain, towards the released position, is connected across the power source E through a suitable resistor. The junction between the switch $S_6$ and the suitable resistor is connected to the base of a switching transistor $Q_{23}$ having an emitter connected to the negative bus NB and a collector connected to a junction $J_3$ which is in turn connected to the positive bus PB through a suitable resistor.

A transistor $Q'_{21}$ corresponding in construction and function to the transistor $Q_{21}$ in the foregoing embodiment of FIG. 9 has a base connected to the base of the transistor $Q_{23}$.

A switching transistor $Q_{26}$ is employed for controlling the electromagnetic coil M. This transistor $Q_{26}$ has a collector-emitter path connected in series with the electromagnetic coil M and a base connected to the positive bus PB through a suitable resistor and the collector of a switching transistor $Q_{25}$. The transistor $Q_{25}$ has an emitter connected to the negative bus NB and a base connected to a junction $J_4$. The junction $J_4$ is connected to the positive bus PB through a suitable resistor and also to the collectors of respective switching transistors $Q'_2$ and $Q'_7$.

The transistor $Q'_7$ has a base connected to the control terminal $T_2$ through a suitable resistor and an emitter connected to the negative bus NB. The transistor $Q'_2$ has an emitter connected to the negative bus NB and a base connected to the output terminal of the transistor control circuit TCC and also to the collector of a switching transistor $Q_{24}$. Transistor $Q_{24}$ has an emitter connected to the negative bus NB and a base connected to the junction $J_2$ through a suitable resistor.

The control system shown in FIG. 10 operates in the following manner.

During any one of the conditions (1), (2) and (3) described hereinbefore and before the switch $S_6$ has been opened, no biasing voltage is applied to any one of the bases of the respective transistors $Q'_7$, $Q_{13}$, $Q'_{21}$ and $Q_{23}$. At this time, since the transistor $Q_{23}$ is in the non-conducting state, the transistor $Q_{20}$ is switched on which results in conduction of the transistor $Q_{22}$. On the other hand, the transistor $Q_{16}$ is also switched on, resulting in the voltage at the junction $J_2$ being brought into the low level state. This in turn results in switching off of the transistor $Q_{15}$ and, hence, the voltage at the junction $J_1$ is brought into the high level state.

The low level voltage at the junction $J_2$ causes the transistor $Q_{24}$ to be switched off while the transistor $Q'_7$ is switched off in the absence of the high level voltage at the control terminal $T_2$.

On the other hand, the switching-off of the transistor $Q'_{21}$ renders the time constant circuit ($C_2$ and $Q_1$ or VR) inoperable. Therefore, the transistor control circuit TCC continues to generate the high level output by which the transistor $Q'_2$ is switched on, the consequence of which is that the transistor $Q_{25}$ is switched off and the transistor $Q_{26}$ is switched on.

The foregoing is an initial condition in which the shutter release button is not depressed, but the main switch $S_1$ is closed in readiness for actual taking of the photographic picture without the utilization of the flash unit.

Subsequent opening of the switch $S_6$ in response to the shutter release while the voltage at the control terminal $T_2$ is in the low level state causes the transistors $Q'_{21}$ and $Q_{23}$ to be switched on. The switching-on of the transistor $Q'_{21}$ completes the time constant circuit ($C_2$ and $Q_1$ or VR). The switching-on of the transistor $Q_{23}$ brings the transistor $Q_{20}$ into the non-conducting state and, therefore, the transistor $Q_{22}$ is also switched off to allow the capacitor $C_2$ to be charged by the current flowing through the transistor $Q'_{21}$ and either the transistor $Q_1$ or the potentiometer VR depending on the position of switch $S_3$.

Since the voltage at the junction $J_3$ at the time the transistor $Q_{23}$ is switched on is in a low level state, the transistor $Q_{16}$ is switched off. However, because the transistor $Q_{13}$ is in the non-conducting state in the absence of a high level voltage at the control terminal $T_2$, the voltage at the junction $J_2$ is maintained in the low level state and, therefore, the transistor $Q_{24}$ is in the non-conducting state. Consequently the transistor $Q'_2$ can be switched on or off depending upon the state of the output signal from the control circuit TCC.

However, when the flash unit is coupled to the photographic camera with the high level voltage applied to the control terminal $T_2$ in readiness for the actual taking of the photographic picture under flash lighting conditions, and before the switch $S_6$ has been opened, the transistor $Q_{13}$ is switched on and the transistors $Q'_{21}$ and $Q_{23}$ are switched off. Therefore, the voltages at the junctions $J_1$ and $J_2$ are respectively in the low level states. At this time, although the transistor $Q_{24}$ is switched off to allow the transistor $Q'_2$ to be controlled by the output signal from the control circuit TCC, the transistor $Q'_7$ is in the conducting state and, therefore, the electromagnetic coil M is energized by the conduction of the transistor $Q_{26}$ irrespective of the state of the output signal from the control circuit TCC.

Subsequent opening of the switch $S_6$ while the voltage at the terminal $T_2$ is still in the high level state results in conduction of the transistors $Q'_{21}$ and $Q_{23}$. Conduction of the transistor $Q_{23}$ brings the transistors $Q_{20}$ and $Q_{16}$ into the non-conducting state. Therefore, the transistor $Q_{22}$ is switched off and the voltage at the junction $J_2$ becomes a high level state. The high level voltage at the junction $J_2$ is then applied to the transistor $Q_{24}$ to switch the latter on and, therefore, the transistor $Q'_2$ is switched off.

Even in this condition, the electromagnetic coil M is energized by the conduction of the transistor $Q_{26}$ because $Q'_7$ is in the conducting state irrespective of the state of the output signal from the transistor control circuit TCC.

When the flash-tube F is subsequently discharged while the switch $S_6$ is opened, the voltage at the control terminal $T_2$ becomes a low level state and the transistor $Q'_7$ is switched off. However, even if the transistor $Q_{13}$ is switched off, the voltage at the junction $J_2$ is in the high level state and the voltage at the junction $J_1$ is maintained in the low level state.

The high level voltage at the junction $J_2$ is applied to the transistor $Q_{24}$ to switch the latter on and therefore, the transistor $Q'_2$ is switched off irrespective of the state of the output signal from the transistor control circuit TCC.

In view of the fact that the transistors $Q'_2$ and $Q'_7$ are switched off, the transistor $Q_{26}$ is switched off to deenergize the electromagnetic coil M to allow the trailing curtain to move from the cocked position towards the released position.

The switch $S_6$ may be returned to the original closed position after the trailing curtain has completed its travel from the cocked position towards the released position or after a film advance lever (not shown) has been manipulated to advance the photosensitive film a distance corresponding to one frame. When the switch $S_6$ is closed subsequent to the closing of the shutter, the transistor $Q_{16}$ is switched on.

In the foregoing embodiments except for the embodiment of FIG. 10, the switches $S'_3$, $S''_3$, $S_4$ and $S'_4$ may be returned to the original opened position after the trailing curtain has completed its travel from the cocked position towards the released position or after a film advance lever (not shown) has been manipulated to advance the photosensitive film a distance corresponding to one frame.

Although the present invention has fully been described in connection with the various preferred embodiments thereof with reference to the accompanying drawings, it is to be noted that various changes and modifications are apparent to those skilled in the art. For example, a control method, such as achieved in the exposure control system shown in FIGS. 3, 6, 7 and 10, wherein the circuit between the output terminal of the control circuit TCC and the electromagnetic coil M is adapted to be disconnected by an electric signal from the flash circuit and the operation of the electromagnetic coil M is also controlled by an electric signal from the flash system, need not be limited to that described above and illustrated in the drawings. For example, the control circuit TCC may be contructed in the form of a digital controlled circuit wherein the exposure time is formed by counting a predetermined number of pulses.

Such changes and modifications, unless they depart from the true scope of this present invention, are to be construed as included therein.

We claim:

1. An electronic flash exposure control means for use in a photographic camera in which the exposure time is achieved by means of a two-curtain type focal plane shutter including leading and trailing curtains movable between released and cocked positions, utilizable in combination with an electronic flash device having an electric energy storing means producing an electrical signal indicative of the energy stored therein, a flash tube and a trigger means for firing the electronic flash device by causing the electric energy stored in said electric energy storing means to be discharged through said flash tube to illuminate a target object to be photographed with flash light from said flash tube, said electronic flash exposure control means comprising in combination:

a closing means adapted to be connected to the focal plane shutter for closing the focal plane shutter;

a first switching circuit connected to said closing means for controlling the closing operation of the focal plane shutter;

a second switching circuit connected to said closing means and said first switching circuit including a shutter closing inhibit means responsive to the electrical signal indicative of the energy stored in the electric energy storing means connected to said first switching circuit for inhibiting the controlling operation of said first switching circuit when said electric energy stored in the electric energy storing means exceeds a predetermined voltage and a closing control means connected to said closing means for causing said closing means to close the focal plane shutter in response to the firing of the electronic flash device;

wherein said first switching circuit includes a time determining circuit for determining a period of time, a first control means connected to said time determining circuit for generating a first output signal after said period of time determined by said time determining circuit, and wherein said closing means includes an electromagnet means connected to said first control means for connection to the trailing curtain of the focal plane shutter for retaining the trailing curtain in the cocked position and for releasing the trailing curtain to allow the latter to move towards the released position in response to the application of said first output signal from said first control means; and wherein said closing control means comprises a second control means responsive to the electrical signal indicative of the energy stored in the electric energy storing means for generating a second output signal when the energy stored in said electric energy storing means is less than said predetermined amount, said second control means being connected to said electromagnet means for releasing the trailing curtain, and wherein said shutter closing inhibit means includes means for causing control of said electromagnet means by said first control means to be inoperative.

2. An electronic flash exposure control means as claimed in claim 1, wherein said shutter closing inhibit means includes means for reducing the time determined by said time determining circuit when the electric energy stored in the electric energy storing means exceeds said predetermined voltage.

3. An electronic flash exposure control means as claimed in claim 1, wherein said shutter closing inhibit means is operable to interrupt the said first output signal from the first control means to said electromagnet means when the electric energy stored in the electric energy storing means exceeds said predetermined voltage.

4. An electronic flash exposure control means as claimed in claim 1 wherein said shutter closing inhibit means includes means for causing the control of said electromagnet means by said first control means to be inoperative in response to the opening of the shutter when the electric energy stored in the electric energy storing means exceeds said predetermined voltage.

5. An electronic flash exposure control means for use in a photographic camera in which the exposure time is achieved by means of a two-curtain type focal plane shutter including leading and trailing curtains movable between released and cocked positions, utilizable in combination with an electronic flash device having an electric energy storing means producing an electrical signal indicative of the energy stored therein, a flash tube and a trigger means for firing the electronic flash device by causing the electric energy stored in said electric energy storing means to be discharged through said flash tube to illuminate a target object to be photographed with flash light from said flash tube, said electronic flash exposure control means comprising in combination:

a closing means adapted to be connected to the focal plane shutter for closing the focal plane shutter;

a first switching circuit connected to said closing means for controlling the closing operation of the focal plane shutter;

a second switching circuit connected to said closing means and said first switching circuit including a shutter closing inhibit means responsive to the electrical signal indicative of the energy stored in the electric energy storing means connected to said first switching circuit for inhibiting the controlling operation of said first switching circuit when said electric energy stored in the electric energy storing means exceeds a predetermined voltage and a closing control means connected to said closing means for causing said closing means to close the focal plane shutter in response to the firing of the electronic flash device;

wherein said closing control means is responsive to the electrical signal indicative of the energy stored in the electric energy storing means and includes means for causing said closing means to close the shutter in response to the decrease of the electric energy stored in the electric energy storing means below said predetermined voltage resulting from the firing of the electronic flash device.

6. An electronic flash exposure control means for use in a photographic camera in which the exposure time is achieved by means of a focal plane shutter, utilizable in combination with an electronic flash device having an electric energy storing means for storing electric energy to be discharged for producing a flash light, said electronic flash exposure control means comprising:

a light measuring circuit for measuring the light intensity of a target to be photographed and for producing an output signal in accordance with the measured light intensity;

a means connected to said light measuring circuit for generating an electric current in accordance with said output signal of said light measuring circuit;

an integrating means connected to said means for generating an electric current for connection to the shutter for initiating integration of said electric current in response to the opening of the shutter;

a means connected to said integrating means for generating a control signal when the amount of the integrated current reaches a predetermined value;

a shutter closing means adapted to be connected to the shutter for closing the shutter;

a first driving means connected to said means for generating a control signal and said shutter closing means for actuating said shutter closing means in response to said control signal for closing the shutter;

a means connected to said driving means for rendering said driving means incapable of actuating said shutter closing means when the electric energy stored in the electric energy storing means of the electronic flash device exceeds a predetermined voltage; and a means adapted to be connected to the electronic flash device for actuating said shutter closing means for closing the shutter in response to the firing of the electronic flash device.

* * * * *